United States Patent
Imajo et al.

(10) Patent No.: US 8,358,386 B2
(45) Date of Patent: Jan. 22, 2013

(54) LIQUID CRYSTAL DISPLAY DEVICE

(75) Inventors: Ikuko Imajo, Mobara (JP); Ryutaro Oke, Chiba (JP); Sachiko Yamazaki, Mobara (JP); Masashi Baba, Chiba (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 454 days.

(21) Appl. No.: 12/691,760

(22) Filed: Jan. 22, 2010

(65) Prior Publication Data

US 2010/0188600 A1 Jul. 29, 2010

(30) Foreign Application Priority Data

Jan. 27, 2009 (JP) .................................. 2009-015119

(51) Int. Cl.
*G02F 1/1335* (2006.01)
(52) U.S. Cl. ......................................... 349/61; 362/561
(58) Field of Classification Search .................... None
See application file for complete search history.

(56) References Cited

U.S. PATENT DOCUMENTS

2010/0231613 A1* 9/2010 Hamada ........................ 345/690

FOREIGN PATENT DOCUMENTS

| JP | 2002-231032 | 8/2002 |
|---|---|---|
| JP | 2004-246117 | 9/2004 |
| JP | 2006-324134 | 11/2006 |
| JP | 2008-97896 | 4/2008 |

* cited by examiner

*Primary Examiner* — Wen-Ying P Chen
(74) *Attorney, Agent, or Firm* — Antonelli, Terry, Stout & Kraus, LLP.

(57) ABSTRACT

In a liquid crystal display device including a liquid crystal display panel, and a backlight disposed on the rear surface of the liquid crystal display panel, the backlight is provided with a plurality of white light-emitting diodes arranged in a plane opposing the liquid crystal display panel. Based on a chromaticity coordinate value representing a color of emission identified for each of the white light-emitting diodes, the white light-emitting diodes are selectively combined for arrangement in proximity in such a manner that the color of emission as a result of averaging over the white light-emitting diodes (1a, 1b) to be arranged in proximity takes a predetermined value of chromaticity coordinates. Accordingly, the resulting liquid crystal display device can offer, although using the white light-emitting diodes having the problem of impairing the uniformity of the color of emission, higher-quality display images using a backlight with less non-uniformity of color and light emission as a whole, and prevents the increase of the manufacturing cost.

5 Claims, 5 Drawing Sheets

LIQUID CRYSTAL DISPLAY DEVICE

The present application claims priority from Japanese application JP 2009-015119 filed on Jan. 27, 2009, the content of which is hereby incorporated by reference into this application.

BACKGROUND OF THE INVENTION

1. Field of the Invention

The present invention relates to a liquid crystal display device and, more specifically, to a liquid crystal display device using a backlight in which a plurality of white light-emitting diodes are systematically arranged in a planar view.

2. Description of the Related Art

A liquid crystal display device is generally provided with a backlight for illuminating a liquid crystal panel from the rear surface thereof. The backlight can be various types of light emission source, and is mainly exemplified by a fluorescent tube including a cold cathode tube, an external electrode fluorescent lamp, and others, a planar light source including an electroluminescent light source, and a point light source including a light-emitting diode (LED).

In recent years, the needs have been increasing specifically for a backlight in which a plurality of light-emitting diodes each being a point light source element are arranged in a planar view due to demands for a liquid crystal display device, e.g., a larger screen, lower power consumption, and control over illumination to suit display images using the backlight.

As described in Patent Document 1 (JP-A-2006-324134), a light-emitting diode is available for combined use with another to deal with lights of various colors such as RGB (Red, Green, and Blue), and using a white light-emitting diode is also possible as described in Patent Document 2 (JP-A-2002-231032), Patent Document 3 (JP-A-2004-246117), and Patent Document 4 (JP-A-2008-97896). Using a white light-emitting diode as such is considered more preferable in terms of reducing the number of light-emitting diodes for use, and preventing the increase of the manufacturing cost.

SUMMARY OF THE INVENTION

The problem with such a white light-emitting diode is that the color of emission varies by product. As exemplarily shown in a chromaticity diagram of FIG. 1, compared with a fluorescent lamp showing the variation in color of emission as an area 3, a white light-emitting diode shows the variation in color of emission as an area 2, i.e., about ten times larger than the area 3 along the x or y axis. As such, when a backlight is configured using a plurality of white light-emitting diodes, the uniformity of color and light emission is lost, e.g., the color of emission by the backlight looks different from part to part on the liquid crystal panel.

In consideration thereof, there may be a possibility of selecting, for use, any white light-emitting diode whose color of emission and amount of emission are both falling within a predetermined range. If this is the configuration, however, most of the white light-emitting diodes will go waste, and thus the resulting liquid crystal display device will be extremely high in cost.

An object of the invention is to solve such problems described above, and to provide a liquid crystal display device that offers, although using white light-emitting diodes having the problem of impairing the uniformity of color of emission, higher-quality display images using a backlight with less non-uniformity of color and light emission as a whole, and prevents the increase of the manufacturing cost.

In order to solve the problems described above, the invention is characterized as below.

1. A liquid crystal display device provided with a liquid crystal display panel, and a backlight disposed on the rear surface of the liquid crystal display panel, characterized in that the backlight is provided with a plurality of white light-emitting diodes arranged in a plane opposing the liquid crystal display panel, and based on a chromaticity coordinate value representing a color of emission identified for each of the white light-emitting diodes, the white light-emitting diodes are selectively combined for arrangement in proximity in such a manner that a color of emission as a result of averaging over the white light-emitting diodes to be arranged in proximity takes a predetermined value of chromaticity coordinates.

2. In the liquid crystal display device described in 1 above, characteristically, based on the chromaticity coordinate value of the color of emission identified for each of the white light-emitting diodes, the white light-emitting diodes are classified into a plurality of groups depending on whether the coordinate values are close to each other or not, the white light-emitting diodes respectively selected specifically from the groups are placed in proximity as a combined unit, and by repeating such a unit placement, the white light-emitting diodes are arranged in the plane.

3. In the liquid crystal display device described in 1 above, characteristically, based on the chromaticity coordinate value representing the color of emission identified for each of the white light-emitting diodes, the white light-emitting diodes are classified into two groups depending on whether the coordinate values are close to each other or not, and the white light-emitting diodes selected from the two groups are arranged alternately in a zigzag arrangement.

4. In the liquid crystal display device described in 1 above, characteristically, based on the chromaticity coordinate value representing the color of emission identified for each of the white light-emitting diodes, the white light-emitting diodes are classified into three groups depending on whether the coordinate values are close to each other or not, and the white light-emitting diodes selected from the three groups are arranged alternately in a delta arrangement.

5. In the liquid crystal display device described in 1 above, characteristically, based on the chromaticity coordinate value representing the color of emission and an intensity of emission identified for each of the white light-emitting diodes, a chromaticity coordinate value is calculated for a color of emission as a result of averaging over the white light-emitting diodes to be arranged in proximity.

6. In the liquid crystal display device described in 5 above, characteristically, the white light-emitting diodes to be arranged in proximity are selectively combined in such a manner that an intensity of emission as a result of averaging over the white light-emitting diodes to be arranged in proximity takes a predetermined value.

With the liquid crystal display device described in 1 above, based on a chromaticity coordinate value representing a color of emission identified for each of the white light-emitting diodes, the white light-emitting diodes are selectively combined for arrangement in proximity in such a manner that a color of emission as a result of averaging over the white light-emitting diodes to be arranged in proximity takes a predetermined value of chromaticity coordinates. Accordingly, the resulting backlight can be with less non-uniformity of color of emission so that the resulting liquid crystal display device can be high in display quality. What is more, because the white light-emitting diodes having the problem of impairing the uniformity of color of emission can be used, the manufacturing cost can be favorably prevented from increasing.

With the configuration described in 2 above, based on the chromaticity coordinate value of the color of emission identified for each of the white light-emitting diodes, the white light-emitting diodes are classified into a plurality of groups depending on whether the coordinate values are close to each other or not, the white light-emitting diodes respectively selected specifically from the groups are placed in proximity as a combined unit, and by repeating such a unit placement, the white light-emitting diodes are arranged in the plane. This accordingly prevents the color of emission from varying among the combined units as such, thereby favorably leading to the backlight with less non-uniformity of color of emission in its entirety. What is more, because the white light-emitting diodes are selectively classified into a plurality of groups in advance, for assembling a backlight, there only needs to fixedly dispose sequentially a specific combined unit of the white light-emitting diodes selected from the respective groups onto a support substrate for supporting the light-emitting diodes. As such, the assembly of the backlight can be completed with the better efficiency.

With the configuration described in 3 above, based on the chromaticity coordinate value of the color of emission identified for each of the white light-emitting diodes, the white light-emitting diodes are classified into two groups depending on whether the coordinate values are close to each other or not, and the white light-emitting diodes selected from the two groups are arranged alternately in a zigzag arrangement. Accordingly, the white light-emitting diodes of two types located in proximity cooperatively emit a light of a predetermined color, and such two types of the white light-emitting diodes are arranged in an alternate manner. With such a configuration, the resulting backlight can be with less non-uniformity of color of emission to a further degree so that the resulting liquid crystal display device can be high in display quality.

With the configuration described in 4 above, based on the chromaticity coordinate value of the color of emission identified for each of the white light-emitting diodes, the white light-emitting diodes are classified into three groups depending on whether the coordinate values are close to each other or not, and the white light-emitting diodes selected from the three groups are arranged alternately in a delta arrangement. Accordingly, the white light-emitting diodes of three types located in proximity cooperatively emit a light of a predetermined color, and such three types of the white light-emitting diodes are arranged in an alternate manner. With such a configuration, the resulting backlight can be with less non-uniformity of color of emission to a further degree so that the resulting liquid crystal display device can be high in display quality.

With the configuration described in 5 above, based on the chromaticity coordinate value representing the color of emission and an intensity of emission identified for each of the white light-emitting diodes, a chromaticity coordinate value is calculated for a color of emission as a result of averaging over the white light-emitting diodes to be arranged in proximity. Accordingly, with a consideration also to any possible variation of the intensity of emission to be observed in each of the white light-emitting diodes, the color of emission in the actual state of light emission can be made to look close to that represented by a target chromaticity coordinate value.

With the configuration described in 6 above, the white light-emitting diodes to be arranged in proximity are selectively combined in such a manner that an intensity of emission as a result of averaging over the white light-emitting diodes to be arranged in proximity takes a predetermined value. Accordingly, any possible variation to be observed in intensity of emission can be reduced so that the resulting liquid crystal display device can be higher in image quality.

DESCRIPTION OF THE PREFERRED EMBODIMENTS

Described below is the configuration of the invention in detail using a preferred example.

Figure 7:
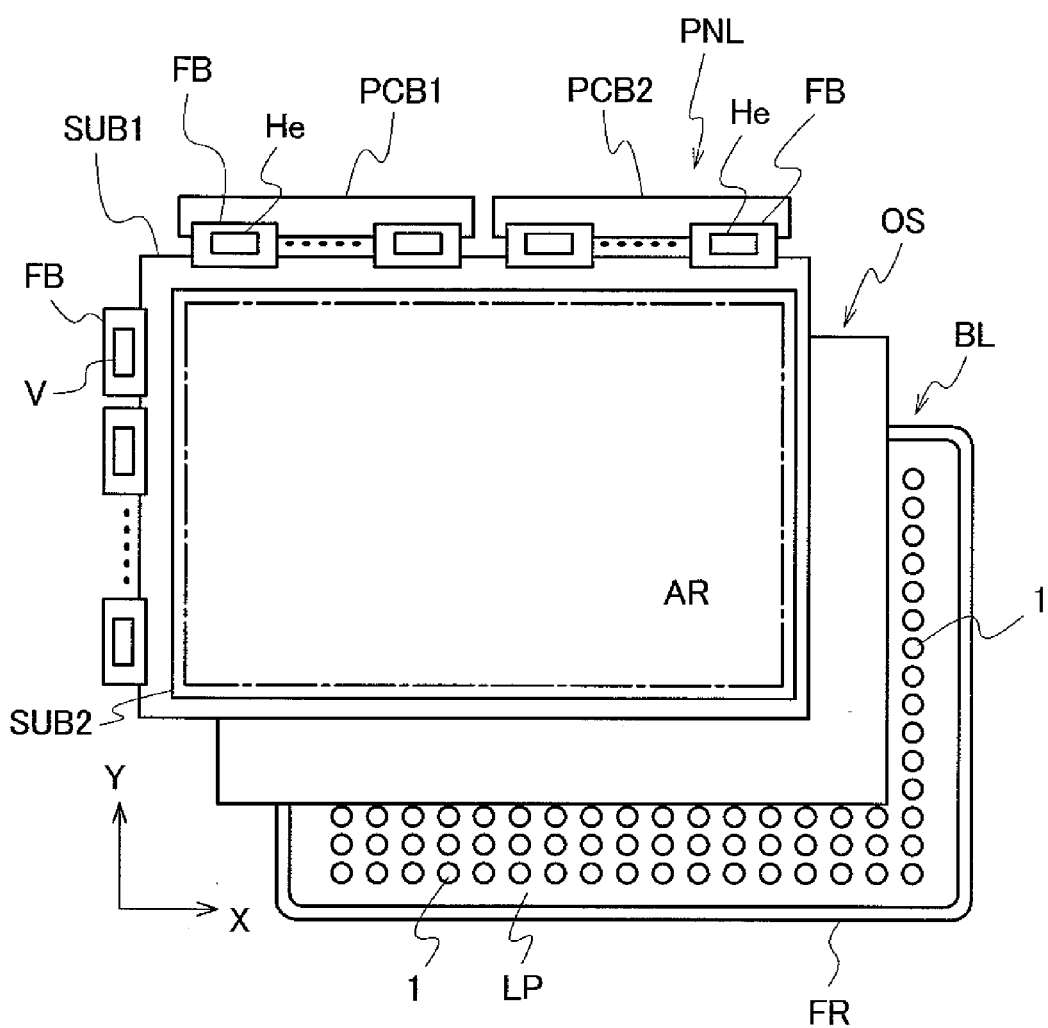
FIG. 7 is a schematic diagram showing the configuration of a liquid crystal display device of the invention.

FIG. 7 is a schematic diagram showing the configuration of a liquid crystal display device to which the invention is applied. A liquid crystal display panel PNL is disposed on the side of a viewer, and on the rear of the liquid crystal display panel PNL, a sheet OS and a backlight BL are disposed in order.

The liquid crystal display panel PNL is provided with a pair of glass-made substrates SUB1 and SUB2 that are disposed to be parallel to each other, for example. These substrates SUB1 and SUB2 sandwich a liquid crystal material therebetween. On the respective surfaces of the substrates SUB1 and SUB2 facing the liquid crystal material, a plurality of pixels (not shown) arranged in a matrix are formed with the liquid crystal material serving as one configuration component, thereby enabling control over a transmittance of light on a pixel basis. The area formed with the pixels as such is referred to as display area AR (area enclosed by alternate long and short dashed lines in the drawing). In this display area AR, images are provided to the viewer to perceive those through a light coming from the backlight BL.

The substrate SUB1 is partially protruded from the substrate SUB2 on the left and upper sides thereof in the drawing, and at these protruded portions, a plurality of flexible substrates FB are each connected on one side. These flexible substrates FB are formed with either a video signal drive circuit He or a scanning signal drive circuit V for driving the pixels individually.

The flexible substrates FB disposed in parallel in the direction of X in the drawing are each formed with the video signal drive circuit He. The flexible substrates FB each formed with the video signal drive circuit He as such are connected with printed circuit boards PCB1 and PCB2 on the side opposing the side connected with the substrate SUB1, and are each provided with a video signal from a control circuit (not shown) via the printed circuit boards PCB1 and PCB2. The flexible substrates FB disposed in parallel in the direction of Y in the drawing are each formed with the scanning signal drive circuit V. The flexible substrates FB formed with the scanning signal drive circuit V as such are each so configured as to be provided with an input signal coming from a display control circuit (not shown) via a wiring pattern (not shown) formed on the respective surfaces of the printed circuit boards PCB1 and PCB2. Unlike the flexible substrates FB each provided with the video signal drive circuit He, any other substrates like the printed circuit boards PCB1 and PCB2 are not specifically connected.

On the rear surface of the liquid crystal display panel PNL, the backlight BL is disposed via a sheet, e.g., a diffusion sheet, a prism sheet, or an optical sheet OS being a laminate of such sheets. The optical sheet OS serves to direct a light from the backlight BL to the liquid crystal display panel PNL by diffusing or gathering the light, for example.

The backlight BL is configured by a plurality of white light-emitting diodes 1 each being a point source element arranged in a matrix. Such a backlight BL is formed on the surface of a support substrate LP, which is disposed to oppose at least the display area AR of the liquid crystal display panel PNL.

In the liquid crystal display device of the invention, the white light-emitting diodes 1 in use are selectively disposed on the support substrate LP so as to satisfy the following requirements.

Requirements for Selection and Combination of White Light-Emitting Diodes are:

to selectively combine a plurality of white light-emitting diodes for arrangement in proximity based on the values of chromaticity coordinates, which each represent a color of emission that is to be identified on a white light-emitting diode basis, i.e., in such a manner that the color of emission as a result of averaging over a plurality of white light-emitting diodes to be arranged in proximity takes a predetermined value of the chromaticity coordinates.

This means that, irrespective of the fact that the white light-emitting diodes vary in color of emission, a plurality of white light-emitting diodes are to be selectively combined to emit, as a whole, lights of color of any predetermined chromaticity coordinate value.

In order to check the chromaticity coordinate value of the color of emission as a result of averaging over a plurality of white light-emitting diodes, there is a method of measuring the chromaticity coordinate value of each of the white light-emitting diodes to be combined. More preferably, there is also a method of measuring in advance the chromaticity coordinate value of each of such white light-emitting diodes, and calculating an average value of the chromaticity coordinate values of the entire white light-emitting diodes to be combined. The latter method is easier and more convenient. Herein, as the chromaticity coordinates, xy chromaticity coordinates of the CIE colorimetric system can be used, but a more preferable choice is the color space coordinate system. In the color space coordinate system, a simple average value of the chromaticity coordinate values is closer to the chromaticity coordinate value of a color of light to be emitted through combination of the light-emitting diodes.

Moreover, the white light-emitting diodes to be actually manufactured have the problem not only of varying color of emission but also of varying intensity of emission. Such varying intensity of emission may be controlled through adjustment of a drive voltage on a light-emitting diode basis. If this is the case, however, the light-emitting diodes each having a different drive voltage in the steady state as such results in the complexity of the drive circuit, and the ease of varying the speed of deterioration of the light-emitting diodes, thereby resultantly shortening the life of the backlight. Moreover, adjusting the intensity of emission causes another variation of the color of emission, thereby increasing the complexity to adjust the color of emission.

As such, giving a consideration to the combination and arrangement of the white light-emitting diodes also in view of the variation of the intensity of emission observed therein is considerably important in view of achieving the object of preventing the increase of the manufacturing cost of the liquid crystal display device, and increasing the life thereof.

The white light-emitting diodes are each identified, in advance, not only by the chromaticity coordinate value of a color of emission but also by the intensity of emission with respect to a predetermined level of drive power. Thereafter, for calculating an average of the chromaticity coordinate values of the entire white light-emitting diodes of a combined set, the intensity of emission of each of the light-emitting diodes is used to calculate a weighted average. As such, the resulting color of emission (chromaticity coordinate value) can be closer to the actual state of light emission.

What is more, by setting the intensity of emission as a result of averaging over the white light-emitting diodes of each combined set (or the intensity of emission in its entirety) to take a predetermined value, the white light-emitting diodes are prevented from varying in intensity of emission irrespective of which combined set. This thus favorably reduces the variation of intensity of emission in the backlight as a whole.

Figure 1:
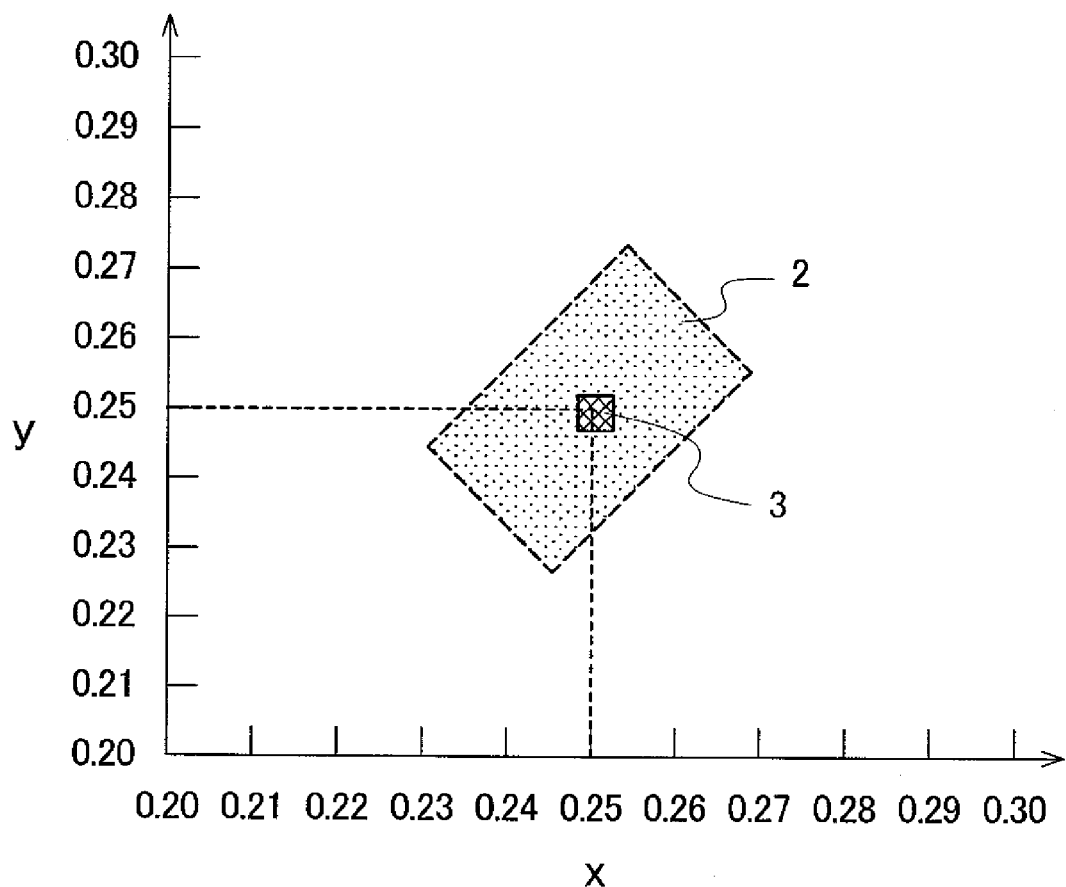
FIG. 1 is a chromaticity diagram for a comparison between a white light-emitting diode and a fluorescent lamp in terms of distribution of chromaticity.

In the above "requirements for selection and combination of white light-emitting diodes", the expression of "predetermined coordinate value" is not restricted to mean only a specific point such as chromaticity coordinate value representing a color of white, i.e., $(x, y)=(0.3127, 0.3290)$, and may rather mean a group (range) of points of coordinates proximal to the specific point, for example. As an example, in a case of wanting a color of emission similarly to a case of using a fluorescent lamp as shown in FIG. 1, such a group of points of coordinates may cover a range around the chromaticity coordinate value of $(x, y)=(0.25, 0.25)$ with the x and y axes both falling within a range of 0.24 to 0.26, more preferably, a range of 0.245 to 0.255.

In order to actually assemble a backlight with good efficiency through selection of white light-emitting diodes, based on the chromaticity coordinate value of the color of emission to be identified for every white light-emitting diode, the white light-emitting diodes are classified into a plurality of groups based on their coordinate values, i.e., whether the coordinate values are close to each other or not. From each of such a plurality of resulting groups, the white light-emitting diode is selected, and the resulting selected white light-emitting diodes are placed in proximity as a combined unit. By repeating such a unit placement, a plurality of white light-emitting diodes are to be arranged in the plane.

That is, the white light-emitting diodes are selectively classified in advance into a plurality of groups in such a manner that any diodes having similar characteristics are gathered in the same group. For assembling a backlight, any required number of the white light-emitting diodes are extracted from the respective groups, and then are fixedly disposed on a support substrate for supporting those diodes with a preset layout. By repeating such an operation, the resulting backlight can be with less non-uniformity of color of emission as a whole. Note here that the number of the light-emitting diodes in each combined set is not restrictive to one from each group, and alternatively, one white light-emitting diode may be extracted from one group, and from another group, two white light-emitting diodes may be extracted, for example.

These extracted white light-emitting diodes may be then combined together to derive a predetermined color of emission (chromaticity coordinate value).

Described next is a specific combination of a plurality of white light-emitting diodes mainly by exemplifying a case of using two groups, and that of using three groups.

Figure 2:
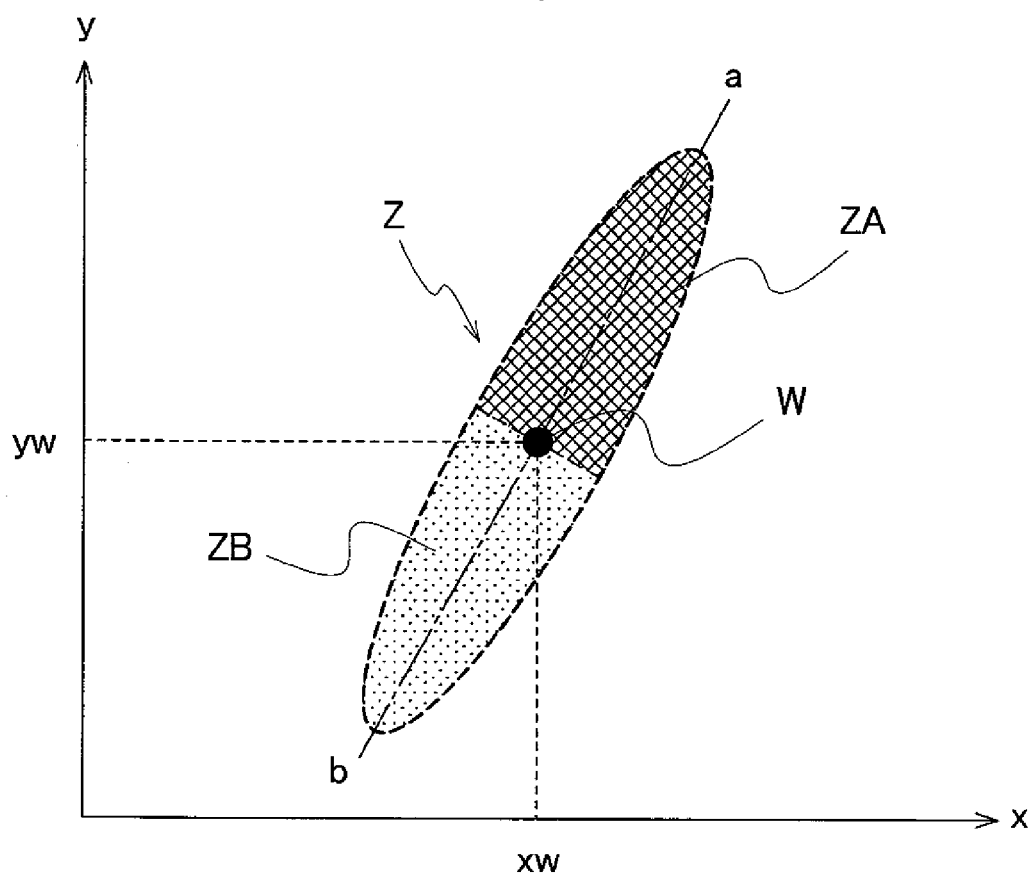
FIG. 2 is a chromaticity diagram for illustrating a method of adjusting the color of emission using two groups of ZA and AB.

The chromaticity coordinate values of the white light-emitting diodes are those in the chromaticity diagram of FIG. 2, i.e., those distributed in the range of a zone Z. The chromaticity coordinate values of the white light-emitting diodes are found with ease by a measurement process in advance. The zone Z indicates the distribution of the values along alternate long and short dashed lines a-b on the chromaticity diagram.

A point W is a predetermined chromaticity coordinate value to be expected when a plurality of white light-emitting diodes are combined together, e.g., chromaticity coordinate value of (xw, yw)=(0.3127, 0.3290) representing a color of white. Note here that the predetermined chromaticity coordinate value expected as such may not necessarily be only the specific point as described above, and may be each designated in an area where the x-axis covers a range of (0.3127−α) to (0.3127+α), and an area where the y-axis covers a range of (0.3290−β) to (0.3290+β). Note here that α and β are each a numeric value within a tolerance.

Figure 3:
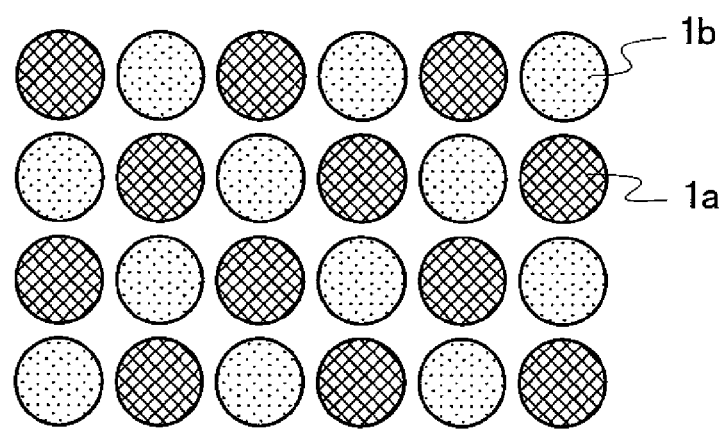
FIG. 3 is a diagram showing an exemplary zigzag arrangement of white light-emitting diodes of two types.

The process of finding a combination of the white light-emitting diodes in the zone Z, i.e., extracting any two white light-emitting diodes with which an average chromaticity coordinate value is the same as that of the point W (or same as a value in the predetermined range) is extremely complicated. Therefore, in the invention, as shown in FIG. 2, the zone Z is divided into two groups of ZA and ZB, which are symmetrical about the point W. From each of the resulting two groups, one white light-emitting diode is extracted at random, and as shown in FIG. 3, the resulting extracted white light-emitting diodes are arranged in a zigzag manner on a support substrate (not shown). In FIG. 3, a reference numeral 1a denotes a white light-emitting diode to be extracted from the group ZA, and a reference numeral 1b denotes a white light-emitting diode to be extracted from the group ZB.

With only either the group of ZA or ZB, there is no clue where in the group the selected white light-emitting diode is located, and how far the light-emitting diode is located from the point W being a target because the light-emitting diode is extracted at random. However, by providing many of such groups of ZA and ZB on the support substrate in its entirety, an average value of the chromaticity coordinate values will be a value as a result of averaging over the average value of the chromaticity coordinate values in the group ZA and that of the chromaticity coordinate values in the group ZB so that the resulting average value will be more approximated to the point W being a target.

Note that, in the embodiment, alternatively, the groups may be each divided into smaller groups based on the distance from the target chromaticity coordinate value (point W), and from any of the resulting small groups located away by almost the same distance from the point W, the white light-emitting diode may be each extracted for combination use.

Figure 4:
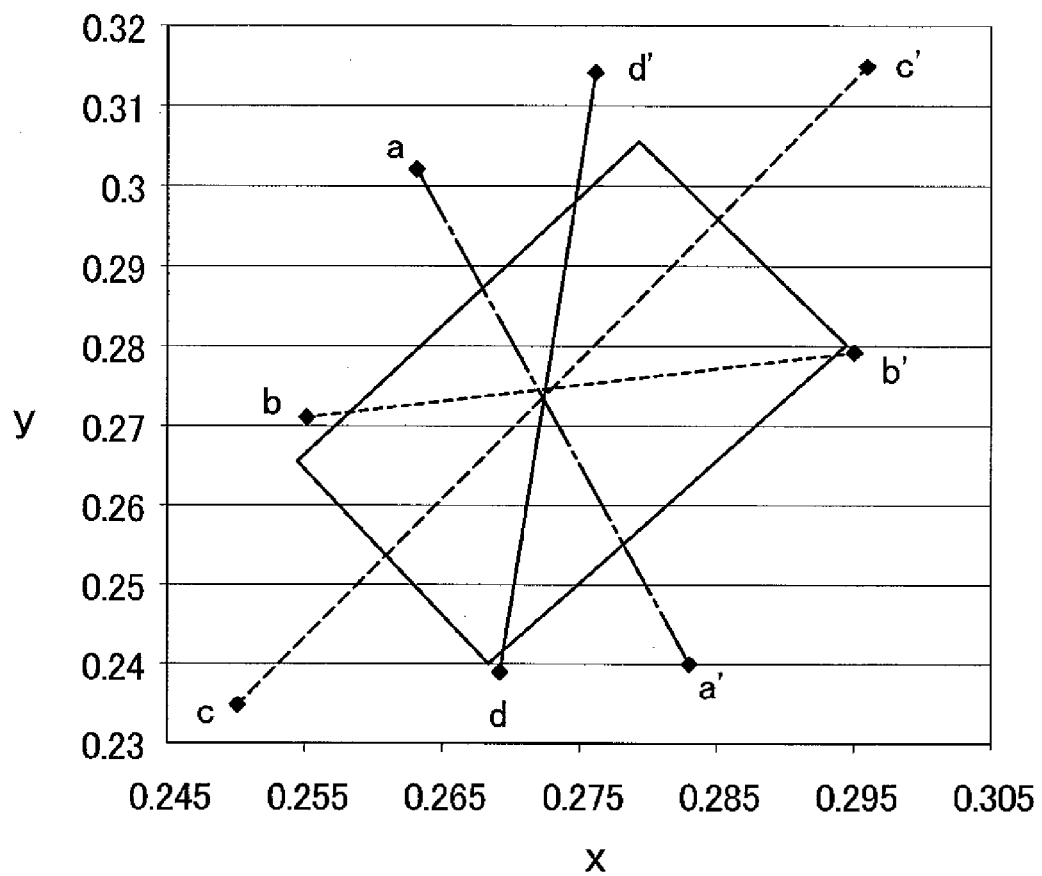
FIG. 4 is a diagram for illustrating the distribution of chromaticity coordinates of white light-emitting diodes to be actually manufactured.

Such an example is of using two groups. When white light-emitting diodes to be manufactured all take the relatively similar chromaticity coordinate values, such an exemplary method causes no problem. However, generally, the actually manufactured white light-emitting diodes may take each different chromaticity coordinate value around the target chromaticity coordinate value. For example, even if white light-emitting diodes are manufactured with a target chromaticity coordinate value of (x, y)=(0.275, 0.275), the resulting white light-emitting diodes will take eight different chromaticity coordinate values as shown in Table 1. FIG. 4 shows such exemplary results in the chromaticity diagram, and a square in the drawing denotes an area where most of such light-emitting diodes are located. Note that, in Table 1, numerical values in the elements of "R", and "B" respectively indicate the intensities of emission of such elements of colors, and the element of "L" denotes the intensity of emission of a white light.

TABLE 1

|    | R   | G   | B   | X-axis | Y-axis | L   |
|----|-----|-----|-----|--------|--------|-----|
| a  | 58  | 100 | 79  | 0.263  | 0.302  | 475 |
| a' | 100 | 56  | 85  | 0.283  | 0.240  | 358 |
| b  | 70  | 100 | 100 | 0.255  | 0.271  | 492 |
| b' | 100 | 70  | 70  | 0.295  | 0.279  | 395 |
| c  | 70  | 70  | 100 | 0.250  | 0.235  | 388 |
| c' | 100 | 100 | 70  | 0.296  | 0.315  | 498 |
| d  | 70  | 100 | 70  | 0.276  | 0.314  | 469 |
| d' | 100 | 70  | 100 | 0.269  | 0.239  | 416 |

Figure 5:
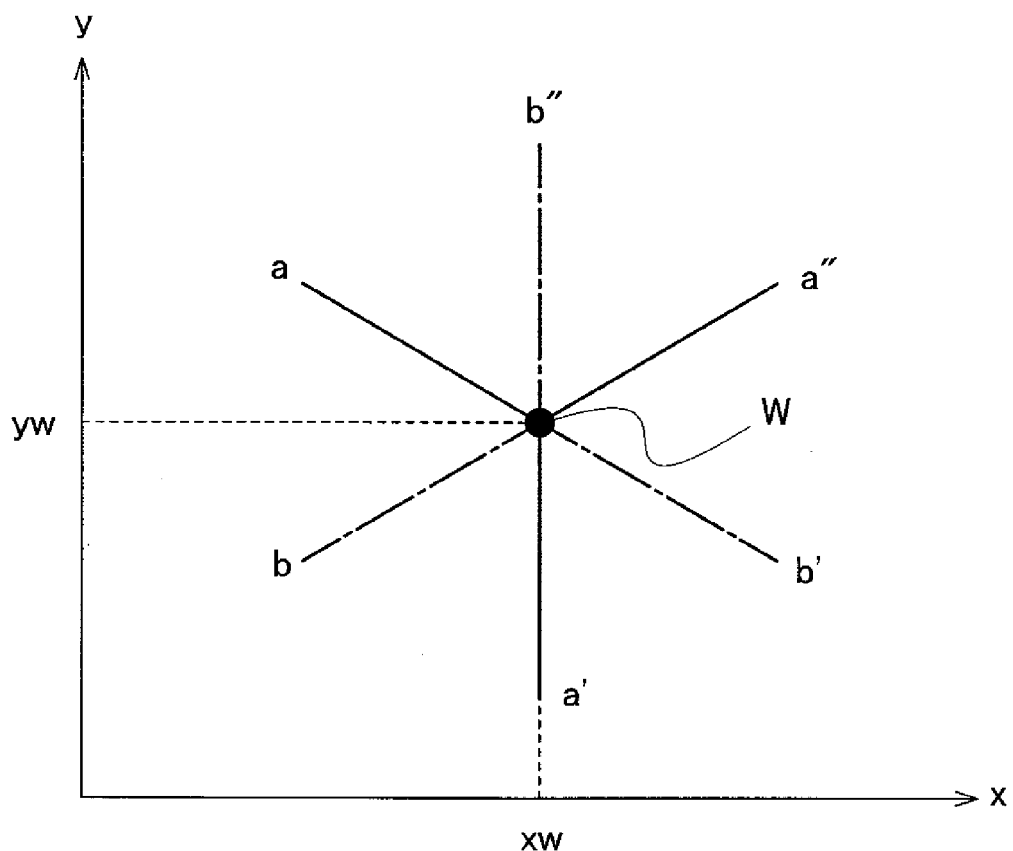
FIG. 5 is a chromaticity diagram for illustrating a method of adjusting the color of emission using three groups.
Figure 6:
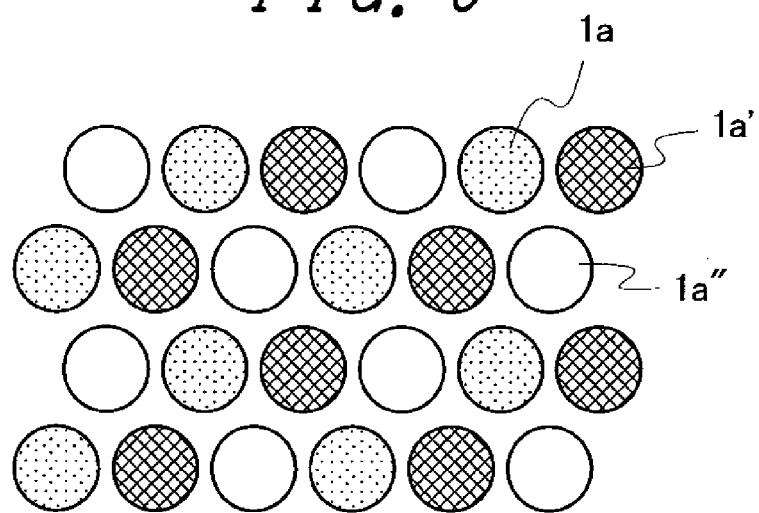
FIG. 6 is a diagram showing an exemplary delta arrangement of white light-emitting diodes of three types.

As shown in FIG. 4, described next is how to deal with a case where the chromaticity coordinate values are scattering in the chromaticity diagram. As shown in FIG. 5, for example, three zones are formed in three directions as indicated by solid lines of a, a', and a", and the light-emitting diodes are gathered into the respective zones depending on their coordinate values, thereby forming three groups. Thereafter, the white light-emitting diodes are selected from these three groups, and are disposed alternately in a delta arrangement as shown in FIG. 6. Note herein that a reference numeral 1a denotes a white light-emitting diode extracted from the zone (group) in the direction of the solid line a, a reference numeral 1a' denotes a white light-emitting diode extracted from the zone (group) in the direction of the solid line a', and a reference numeral 1a" denotes a white light-emitting diode extracted from the zone (group) in the direction of the solid line a".

Also in a case of adjusting the combination of the white light-emitting diodes by forming three groups as such, similarly to the above-described case of using two groups, the groups may be each divided into smaller groups based on the distance from the target chromaticity coordinate value (point W), and from any of the resulting small groups located away by almost the same distance from the point W, the white light-emitting diode may be each extracted for combination use.

In FIG. 6, the white light-emitting diodes are extracted only from the three groups for arrangement, but alternatively, the configuration below is also possible. That is, three zones are formed in other three directions as indicated by alternate long and short dashed lines of b, b', and b" of FIG. 5, and the light-emitting diodes are gathered into the respective zones depending on their coordinate values, thereby forming new three groups. Thereafter, the delta-shaped combined unit including the white light-emitting diodes extracted from the three groups based on the solid lines of a, a', and a" may be disposed together with another delta-shaped combined unit including the white light-emitting diodes extracted from the other three groups based on the alternate long and short dashed lines b, b', and b".

In the above-described example of using the two or three groups, the white light-emitting diodes are all assumed to have almost the same intensity of emission. However, needless to say, the intensity of emission of each of the light-emitting diodes may be used as a basis to change the combination thereof.

As described in the foregoing, according to the invention, provided can be a liquid crystal display device that offers, although using white light-emitting diodes having the problem of impairing the uniformity of color of emission, higher-quality display images using a backlight with less non-uniformity of color and light emission, and prevents the increase of the manufacturing cost.

What is claimed is:

1. A liquid crystal display device provided with a liquid crystal display panel, and a backlight disposed on a rear surface of the liquid crystal display panel, wherein
   the backlight is provided with a plurality of white light-emitting diodes arranged in a plane opposing the liquid crystal display panel,
   based on a chromaticity coordinate value representing a color of emission identified for each of the white light-emitting diodes, the white light-emitting diodes are selectively combined for arrangement in proximity in such a manner that a color of emission as a result of averaging over the white light-emitting diodes to be arranged in proximity takes a predetermined value of chromaticity coordinates, and
   based on the chromaticity coordinate value representing the color of emission identified for each of the white light-emitting diodes, the white light-emitting diodes are classified into at least three groups depending on whether the coordinate values are close to each other or not, the white light-emitting diodes respectively selected specifically from the at least three groups are placed in proximity as a combined unit, and by repeating such a unit placement, the white light-emitting diodes are arranged in the plane.

2. The liquid crystal display device according to claim 1, wherein
   based on the chromaticity coordinate value representing the color of emission and an intensity of emission identified for each of the white light-emitting diodes, a chromaticity coordinate value is calculated for a color of emission as a result of averaging over the white light-emitting diodes to be arranged in proximity.

3. The liquid crystal display device according to claim 2, wherein
   the white light-emitting diodes to be arranged in proximity are selectively combined in such a manner that an intensity of emission as a result of averaging over the white light-emitting diodes to be arranged in proximity takes a predetermined value.

4. The liquid crystal display device according to claim 1, wherein the number of white light-emitting diodes included in the combined unit is equal to the number of groups classifying the white light-emitting diodes.

5. A liquid crystal display device provided with a liquid crystal display panel, and a backlight disposed on a rear surface of the liquid crystal display panel, wherein
   the backlight is provided with a plurality of white light-emitting diodes arranged in a plane opposing the liquid crystal display panel,
   based on a chromaticity coordinate value representing a color of emission identified for each of the white light-emitting diodes, the white light-emitting diodes are selectively combined for arrangement in proximity in such a manner that a color of emission as a result of averaging over the white light-emitting diodes to be arranged in proximity takes a predetermined value of chromaticity coordinates, and
   based on the chromaticity coordinate value representing the color of emission identified for each of the white light-emitting diodes, the white light-emitting diodes are classified into three groups depending on whether the coordinate values are close to each other or not, and the white light-emitting diodes selected from the three groups are arranged alternately in a delta arrangement.

* * * * *